MULTIFREQUENCY SIGNAL GENERATOR

Filed July 8, 1968

(WITH UNRESTRICTED LIMITING)

(WITH RESTRICTED LIMITING)

INVENTORS D. FELDMAN
T.N. RAO
BY
ATTORNEY

United States Patent Office 3,518,571
Patented June 30, 1970

3,518,571
MULTIFREQUENCY SIGNAL GENERATOR

David Feldman, Springfield, and Tadikonda N. Rao, Plainfield, N.J., assignors to Bell Telephone Laboratories, Incorporated, Murray Hill, N.J., a corporation of New York Filed July 8, 1968, Ser. No. 743,108
Int. Cl. H03b *5/26*
U.S. Cl. 331—109 15 Claims

ABSTRACT OF THE DISCLOSURE

A conventional transistor oscillator circuit is made wholly compatible with integrated circuit technology by employing a limiter circuit utilizing circuit components that can be incorporated in the monolithic chip containing the amplifier. Limiting is achieved by the utilization of a negative feedback path employing a uniquely connected network of resistors and transistors.

BACKGROUND OF THE INVENTION

Field of the invention

This invention relates to transistor oscillator circuits and more particularly to limiter circuits associated therewith.

Description of the prior art

Multifrequency signal generators with the capability of producing unique coincident pairs of oscillatory signal bursts in response to the actuation of a pushbutton or other manually actuated switches are well known, as disclosed for example by L. A. Meacham and F. West in U.S. Pat. No. 3,184,554, issued May 18, 1965.

One form of the arrangement shown by Meacham and West is employed commercially as a pushbutton operated dial for a telephone set, the Bell System version of which is known as the Touch-Tone® telephone. Each signal pair generated by the dial of a pushbutton dial telephone includes one signal from a relatively high frequency band and one signal from a relatively low frequency band, and each unique frequency combination is indicative of a dialed digit in accordance with a frequency code.

Initially, the generation of pushbutton dial telephone tone signals was effected by a single transistor oscillator with an inductively coupled feedback circuit. Certain of the frequency determining elements in the feedback circuit were selectively switched into and out of the circuit to obtain the desired frequency combinations. Improvements in multifrequency signal generator circuits of this general type have included the use of two substantially separate transistor oscillators which has helped to reduce interference between the generated frequencies, and the employment of twin-T R-C filters in the amplifier feedback path, which has eliminated the need for inductors and has thus made the circuits more compatible with integrated circuit fabrication techniques. A circuit of this latter type has been disclosed by R. L. Breeden and R. M. Rickert in a copending application Ser. No. 487,138 filed Sept. 14, 1965.

Despite the improvements indicated, multifrequency signal generating circuits of the type employed in pushbutton telephone sets are substantially less than ideal from the standpoint of both fabrication and operation. One of the problems that remains unsolved relates to the fact that the circuits are still not fully compatible with the latest integrated circuit fabrication techniques, particularly those techniques dealing with silicon chips. One specific example of this lack of compatibility concerns the oscillator limiter circuit. Heretofore, conventional limiting means have been employed which typically involve the use of limiting diodes and at least one large coupling capacitor. Although some types of diode circuit devices are amenable to silicon chip technology and thus integratable with the circuit elements of the amplifier chip, such fabrication techniques are not commercially feasible for diodes of the type employed heretofore in limiter circuits. Moreover, the integration of large magnitude capacitors in silicon chips is still well beyond the present state of the art.

The absence of complete compatibility with the fabrication techniques of integrated circuitry not only denies otherwise inherent advantages in terms of both circuit economy and reliability, but also denies the related equipment designer, the designer of a telephone handset for example, the full flexibility of physical design parameters that would necessarily accompany the use of a circuit that occupies only a small fraction of the space required by conventional arrangements.

An additional problem in prior art multifrequency generators of the type indicated also relates to the oscillator limiting function and specifically to the fact that in prior art limiters the degree of limiting is influenced unduly by variations in loop length (equivalent to variations in B+ supply) and by variations in temperature. Moreover, it has been found in the prior art that temperature induced changes in the characteristics of certain limiting circuits in turn induce variations in the oscillator frequency.

A broad object of the invention is to provide solutions for the problems indicated.

SUMMARY OF THE INVENTION

The stated problems and related problems are solved in accordance with the principles of the invention by the employment of a unique limiter circuit in the amplifier portion of a transistor oscillator, all of the circuit elements of the limiter being readily integratable with the silicon chip embodying the active elements of the amplifier or being integratable with associated thin film employed for certain of the inactive elements of the amplifier. In accordance with the invention, adverse effects on the limiting function from temperature changes, differing from those to which the active elements of the amplifier are exposed, is avoided. Specifically, the temperature-sensitive elements of both the amplifier and the limiting circuit have been so selected, in accordance with the invention, to permit their incorporation in a common silicon chip and thus, all such elements share precisely the same environment, including temperature.

In accordance with one feature of the invention, the possibility of affecting oscillator frequency by temperature induced effects in the limiting circuit is also avoided in that the elements of the limiting circuit are no longer directly associated with the frequency determining elements of the oscillator.

A basic aspect of an oscillator limiting circuit in accordance with the invention is that limiting is achieved by the utilization of a negative feedback signal, applied by way of the network indicated, from the output of the final intermediate stage of the amplifier circuit to the input of the second intermediate stage thereof. The degree of limiting, or the magnitude of the limiting signal, is controlled by a resistive divider circuit employing two resistors. In accordance with the invention, the divider is also designed to eliminate temperature dependence. This feature is achieved by fabricating one of the resistors in the form of a silicon film and the other resistor in the form of a tantalum film. The different temperature coefficients of silicon and tantalum are so related that when the resistive elements are connected, in accordance with the invention, temperature effects that would otherwise vary the level of positive feedback circuit are canceled. Specifically, accurate voltage tracking despite temperature changes is ensured between the voltage divider midpoint and the input point of the amplifier stage to which the negative feedback is applied.

DESCRIPTION OF AN EMBODIMENT

Figure 1:
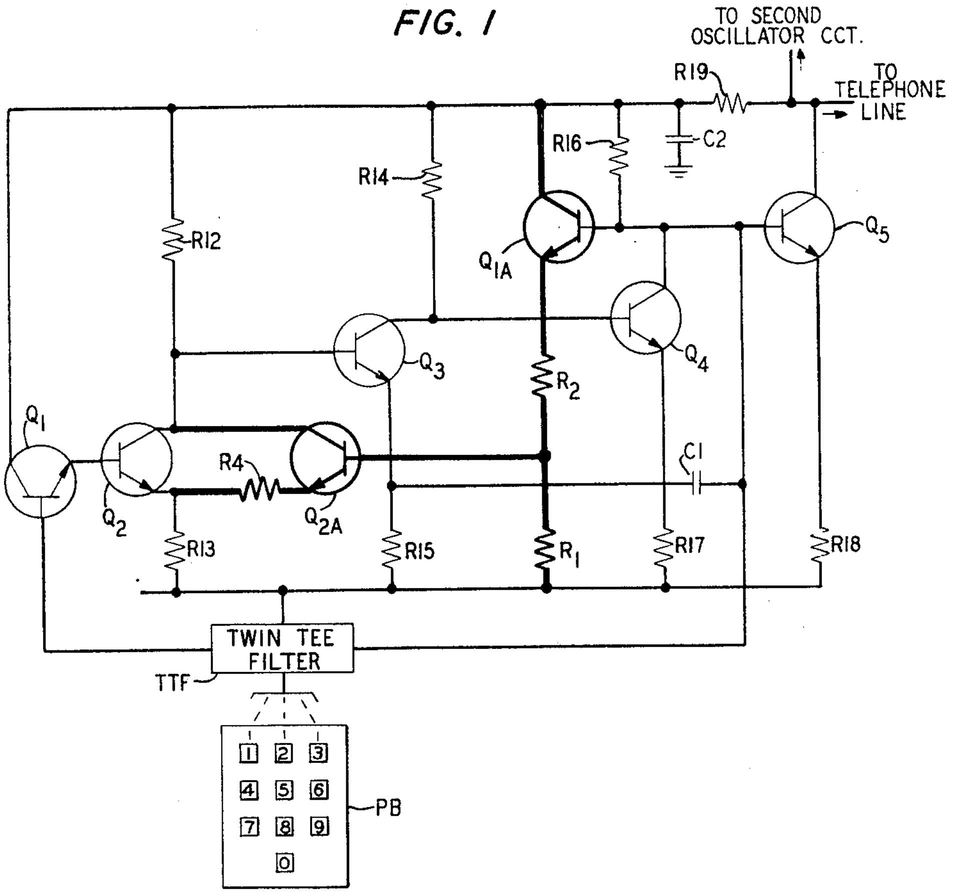
FIG. 1 is a schematic circuit diagram of an oscillator circuit in accordance with the invention.

In FIG. 1 the features of the invention are shown embodied in an oscillator circuit of the type employed as a dial signal generator in certain pushbutton dial telephone sets. These sets typically employ two identical oscillators, one being used for the generation of any one of four signals in a relatively low frequency band, and the other being used for the generation of any one of four signals in a relatively high frequency band. In the interest of simplification and clarity, only a single oscillator circuit is shown in FIG. 1; a complete dual oscillator circuit of this general type is shown by Breeden and Rickert in the copending application cited above.

In FIG. 1, the limiting circuit in accordance with the invention is shown in heavy lines. The conventional portion of the circuit comprises transistors Q1 through Q5, Q1 being the input stage and Q5 being the output stage. Resistors R12 to R19 perform conventional loading or biasing functions. Capacitor C1 provides a stabilizing feedback path between the second and third intermediate amplifier stages comprising transistors Q3 and Q4. The twin-T filter TTF, the frequency determining portion of the circuit, is fully conventional and employs only resistive and capacitive circuit elements. The 180 degree phase shift thus introduced between the collector of transistor Q4 and the base of transistor Q1 ensures the generation of the oscillatory signal.

The particular frequency of oscillation is determined by the operation of one of the pushbuttons in the pushbutton dial PB, which initiates a switching action to connect a particular resistor, not shown, and the filter TTF which corresponds to the number dialed in terms of the usual frequency code. Although the second oscillator circuit is not shown, the connecting paths thereto are indicated.

The limiting circuit in accordance with the invention may be viewed as a negative feedback path extending from the collector of transistor Q4 to the collector of transistor Q2. The feedback signal path includes the base-emitter junction of transistor Q1A, resistor R2 and the base-collector junction of transistor Q2A.

The purpose of resistor R4 connected in the emitter lead of transistor Q2A prevents transistor Q2A from saturating and thus avoids the presentation of a low impedance at the emitter of transistor Q1. Oscillator frequency shifts which might otherwise occur are thus avoided. In one embodiment of the invention, resistive magnitudes employed for the resistors indicated were as follows:

| | |
|---|---|
| R1—10K | R15—1K |
| R2—5K | R16—1.5K |
| R4—300 ohms | R17—240 ohms |
| R12—12K | R18—225 ohms |
| R13—1.5K | R19—1K |
| R14—7.5K | |

In following the operation of the limiting circuit, it is helpful to assume first that the emitters of transistors Q1A and Q1 are at the same D.C. potential and that the resistive magnitude of resistor R2 is negligible. With this assumption, it is clear that the bases of transistors Q2 and Q2A are at the same D.C. potential and that during the positive half-cycles of the signal at the collector of transistor Q4, transistor Q2A conducts, applying negative feedback to the base of transistor Q3 so that limiting occurs.

Figure 2A:
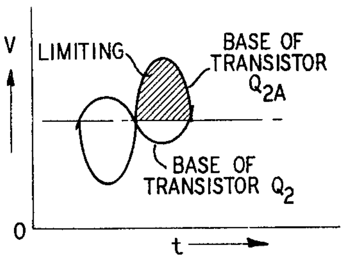
FIG. 2A is a waveform plot illustrating the operation of the circuit of FIG. 1 with uncontrolled limiting.
Figure 2B:
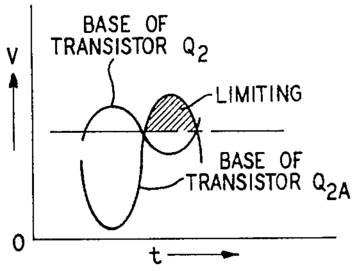
FIG. 2B is a waveform plot illustrating the operation of the circuit of FIG. 1 with controlled limiting.

If resistor R2 were of negligible magnitude, as assumed, negative feedback would occur during the whole positive half-cycle at the collector of transistor Q4. Such operation is illustrated by the waveforms of FIG. 2A. Negative feedback of this magnitude, however, would be excessive and would probably prevent the circuit from oscillating. Accordingly, a feature of the invention involves selecting the magnitude of resistor R2 so that the voltage drop that results from the voltage divider action of resistors R1 and R2 controls the feedback level, ensuring limiting only at the peaks of the positive cycle at the collector of transistor Q4. Such operation is illustrated by the waveforms of FIG. 2B. The precise amount of negative feedback, or limiting, can of course be adjusted as necessary by varying the resistance ratio between the resistors R1 and R2.

If the collector currents of transistors Q1 and Q1A were substantially equal, the effects of loop length variation (equivalent to B+ variation) and temperature variation would cancel out. As a result of the action of the R1, R2 voltage divider, however, some changes in the degree of limiting are caused by changes in either loop length or temperature. Although limiting voltage changes resulting from loop length variations are negligible and may for all practical purposes be disregarded, variations in limiting voltage with temperature are of sufficient magnitude, approximately 2.5 db, to warrant some means of elimination or reduction. Substantial elimination of temperature effects is achieved in accordance with the invention by fabricating the resistor R2 from silicon which has a temperature coefficient of approximately 2200 p.p.m./° C., and by fabricating the resistor R2 in tantalum which has a temperature coefficient of approximately −100 p.p.m./° C. As a result, despite temperature variations, near perfect voltage tracking is achieved between the common terminal of the resistors R1 and R2 and the base or input point of transistor Q3. It is this voltage tracking which, in effect, eliminates the temperature dependence of the limiter circuit.

It is to be understood that the embodiment described herein is merely illustrative of the principles of the invention. Various modifications thereto may be effected by persons skilled in the art without departing from the spirit and scope of the invention.

What is claimed is:

1. An oscillatory signal generator comprising, in combination,
   - a multistage transistor amplifier including an input stage, an output stage and intermediate stages,
   - a positive feedback path including only resistive and capacitive elements connecting the output of one of said intermediate stages to the input of said input stage, and
   - a limiter circuit comprising a negative feedback network of transistors and resistive elements interconnecting the output of said last named intermediate stage with the input of another one of said intermediate stages.

2. Apparatus in accordance with claim 1 wherein the transistors of said amplifier and the transistors of said network are of the same conductivity type.

3. Apparatus in accordance with claim 2 wherein the transistors of said amplifier and the transistors of said network are fabricated in a common monolithic silicon chip.

4. Apparatus in accordance with claim 2 wherein said network includes means for controlling the level of limiting applied by said negative feedback network.

5. Apparatus in accordance with claim 4 wherein said last named means comprises a resistive divider having first and second resistive elements connected in series relation, the ratio of the resistive magnitudes of said resistors being determinative of the magnitude of negative feedback applied by said network.

6. Apparatus in accordance with claim 5 wherein said resistors have different temperature coefficients thereby rendering the limiting function of said circuit substantially immune to the effects of variations in temperature.

7. An oscillatory signal generator comprising, in combination, a multistage transistor amplifier including an input stage, an output stage and intermediate stages, a positive feedback path including only resistive and capacitive elements connecting the output of one of said intermediate stages to the input of said input stage, and a negative feedback limiter circuit comprising first and second transistors, said first transistor having the base electrode thereof connected to the output of said one of said intermediate stages, first means connecting the emitter electrode of said first transistor to the base electrode of said second transistor, second means connecting the collector electrodes of said second transistor and a transistor forming the first one of said intermediate stages, and third means connecting the emitter electrodes of said last named two transistors.

8. Apparatus in accordance with claim 7 wherein said first means includes a first resistive element, a second resistive element in series relation with said first resistive element thereby forming a voltage divider having the common terminal thereof connected to the base electrode of said second transistor, said second resistor having the free terminal thereof connected to a source of reference potential.

9. Apparatus in accordance with claim 8 wherein said first and second resistive elements are formed from materials having different temperature coefficients, thereby to eliminate the temperature dependence of said limiter circuit.

10. Apparatus in accordance with claim 9 wherein said first resistive element comprises silicon and wherein said second resistive element comprises tantalum.

11. Apparatus in accordance with claim 9 wherein said third means comprises a third resistive element thereby to reduce frequency shift in said generator.

12. A dual frequency oscillatory dial signal generator for a telephone set comprising two substantially identical oscillator circuits each comprising, in combination, a multistage transistor amplifier including an input stage, an output stage, and intermediate stages, a positive feedback path including only resistive and capacitive elements, dial means for selectively switching individual ones of said resistive elements into and out of said feedback path thereby to establish frequency code patterns, the improvement in each of said oscillator circuits comprising a negative feedback limiter circuit including first and second transistors, said first transistor having the base electrode thereof connected to the output of one of said intermediate stages, first means connecting the emitter electrode of said first transistor to the base electrode of said second transistor, second means connecting the collector electrodes of said second transistor and a transistor forming the first one of said intermediate stages, and third means connecting the emitter electrodes of said last two named transistors.

13. Apparatus in accordance with claim 12 wherein said first means includes a first resistive element, a second resistive element in series relation with said first resistive element thereby forming a voltage divider having the common terminal thereof connected to the base electrode of said second transistor, said second resistor having the free terminal thereof connected to a source of reference potential.

14. Apparatus in accordance with claim 13 wherein said first and second resistive elements are formed from materials having different temperature coefficients, thereby to eliminate the temperature dependence of said limiter circuit.

15. Apparatus in accordance with claim 14 wherein said first resistive element comprises silicon and wherein said second resistive element comprises tantalum, all of the transistors of said amplifier and of said limiting circuit being of the same conductivity type and being incorporated in a common monolithic silicon chip.

References Cited

UNITED STATES PATENTS 3,424,870 1/1969 Breeden et al. ------ 331—142

JOHN KOMINSKI, Primary Examiner

U.S. Cl. X.R.

331—110, 142